United States Patent
Chen et al.

(10) Patent No.: US 9,203,850 B1
(45) Date of Patent: Dec. 1, 2015

(54) SYSTEMS AND METHODS FOR DETECTING PRIVATE BROWSING MODE

(71) Applicant: Symantec Corporation, Mountain View, CA (US)

(72) Inventors: Jimmy Chen, Sacramento, CA (US); Charles Trinh, Anaheim, CA (US)

(73) Assignee: Symantec Corporation, Mountain View, CA (US)

(*) Notice: Subject to any disclaimer, the term of this patent is extended or adjusted under 35 U.S.C. 154(b) by 0 days.

(21) Appl. No.: 14/178,281

(22) Filed: Feb. 12, 2014

(51) Int. Cl.
*H04L 29/06* (2006.01)
*G06F 21/12* (2013.01)
*H04L 12/24* (2006.01)

(52) U.S. Cl.
CPC .......... *H04L 63/1408* (2013.01); *G06F 21/128* (2013.01); *H04L 41/0253* (2013.01)

(58) Field of Classification Search
CPC ............ H04L 63/1408; H04L 41/0253; G06F 21/128
See application file for complete search history.

(56) References Cited

U.S. PATENT DOCUMENTS

| | | | |
|---|---|---|---|
| 2010/0017605 A1* | 1/2010 | Chieze et al. | 713/168 |
| 2011/0167492 A1* | 7/2011 | Ghosh et al. | 726/23 |
| 2012/0240237 A1* | 9/2012 | Kanevsky et al. | 726/26 |
| 2013/0097699 A1* | 4/2013 | Balupari et al. | 726/22 |
| 2013/0294263 A1* | 11/2013 | Haga et al. | 370/252 |
| 2014/0013072 A1* | 1/2014 | Liu et al. | 711/170 |

OTHER PUBLICATIONS

Mahendrakar et al., "Forensic Analysis of Private Browsing Mode in Popular Browsers", 2012, pp. 1-9.*
"Detect anonymous / incognito browsing", http://stackoverflow.com/questions/14379317/detect-anonymous-incognito-browsing, as accessed Dec. 11, 2013, Stack Overflow, (Jan. 17-25, 2013).

* cited by examiner

*Primary Examiner* — Taghi Arani
*Assistant Examiner* — Thaddeus Plecha
(74) *Attorney, Agent, or Firm* — ALG Intellectual Property, LLC

(57) ABSTRACT

A computer-implemented method for detecting private browsing mode may include (1) determining that a browser application is operating as a foreground application on the computing device, (2) detecting computing activity occurring on the computing device while the browser is operating in the foreground, (3) determining that no new entry has been made in the browser's history, (4) in response to determining that no new entry has been made in the browser's history, incrementing a certainty level score that identifies a level of certainty that the browser is executing in private browsing mode, (5) determining that the certainty level score has exceeded a certainty threshold, indicating that the browser is likely to be executing in private browsing mode, and (6) performing a security action in response to determining that the browser is likely to be executing in private browsing mode. Various other methods, systems, and computer-readable media are also disclosed.

19 Claims, 5 Drawing Sheets

SYSTEMS AND METHODS FOR DETECTING PRIVATE BROWSING MODE

BACKGROUND

Most modern internet browsers now include an option to operate the browser in a private browsing mode in which visited websites are not recorded in the browser's history. While private browsing mode offers various privacy advantages, it may also present problems for parents who want to supervise their children's internet activities and/or organizations that want to assure that the organization's computing resources are being used according to policy. These problems may be particularly acute with browsers running on mobile devices, such as smartphones, since the devices may be easily used where visual supervision is not possible.

Accordingly, the instant disclosure identifies and addresses a need for additional and improved systems and methods for detecting when a web browser is operating in private browsing mode.

SUMMARY

As will be described in greater detail below, the instant disclosure generally relates to systems and methods for detecting private browsing mode by detecting processor, memory, or network usage while a browser is running as a foreground application, then determining whether an entry has been made in the browser's history. If sufficient evidence is compiled to determine with a degree of certainty that the browser is operating in private browsing mode, a security action may be taken, such as notifying an administrator or blocking browser usage.

In one example, a computer-implemented method for detecting private browsing mode may include (1) determining that a browser application is operating as a foreground application on the computing device, (2) detecting computing activity occurring on the computing device while the browser is operating in the foreground, (3) determining that no new entry has been made in the browser's history, (4) in response to determining that no new entry has been made in the browser's history, incrementing a certainty level score that identifies a level of certainty that the browser is executing in private browsing mode, (5) determining that the certainty level score has exceeded a certainty threshold, indicating that the browser is likely to be executing in private browsing mode, and (6) performing a security action in response to determining that the browser is likely to be executing in private browsing mode.

In some examples, detecting the computing activity may include selecting a sampling interval that determines how often computing activity will be measured and then (1) determining that network communication has occurred during the sampling interval while the browser is operating in the foreground, (2) determining that CPU activity has exceeded a CPU activity threshold during the sampling interval while the browser is operating in the foreground, and/or (3) determining that memory usage has exceeded a memory usage threshold during the sampling interval while the browser is operating in the foreground.

In some examples, performing the security action may include (1) notifying an administrative user that the browser is likely to be executing in private browsing mode, (2) displaying a message that the use of private browsing mode is restricted on the computing device, (3) blocking execution of the browser application, and/or (4) blocking network communication on the computing device. In one embodiment, the security action is selected to be performed based at least in part on the magnitude of the certainty level score relative to the certainty threshold. In one embodiment, the computing device may include a mobile device.

In one embodiment, a system for implementing the above-described method may include several modules stored in memory, including (1) a determination module that determines that a browser application is operating as a foreground application on a computing device, (2) an activity module that detects computing activity occurring on the computing device while the browser is operating in the foreground, (3) a monitoring module that determines that no new entry has been made in the browser's history, (4) a certainty module that, (a) in response to determining that no new entry has been made in the browser's history, increments a certainty level score that identifies a level of certainty that the browser is executing in private browsing mode and (b) determines that the certainty level score has exceeded a certainty threshold, indicating that the browser is likely to be executing in private browsing mode, (5) a security module that performs a security action in response to determining that the browser is likely to be executing in private browsing mode, and (6) at least one processor configured to execute the determination module, the activity module, the monitoring module, the certainty module, and the security module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to (1) determine that a browser application is operating as a foreground application on the computing device, (2) detect computing activity occurring on the computing device while the browser is operating in the foreground, (3) determine that no new entry has been made in the browser's history, (4) in response to determining that no new entry has been made in the browser's history, increment a certainty level score that identifies a level of certainty that the browser is executing in private browsing mode, (5) determine that the certainty level score has exceeded a certainty threshold, indicating that the browser is likely to be executing in private browsing mode, and (6) perform a security action in response to determining that the browser is likely to be executing in private browsing mode.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
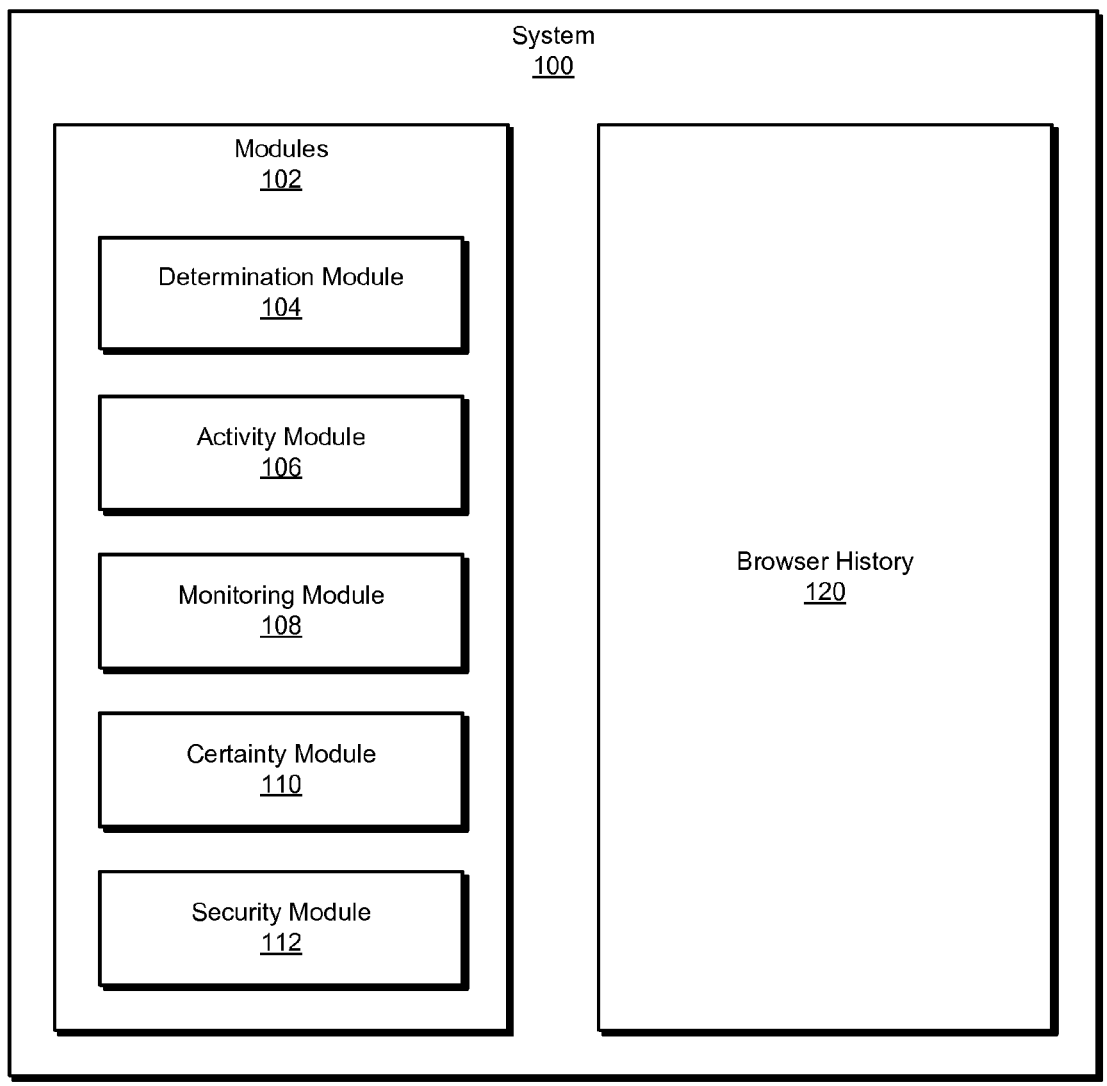
FIG. 1 is a block diagram of an exemplary system for detecting private browsing mode.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

The present disclosure is generally directed to systems and methods for detecting private browsing mode. As will be explained in greater detail below, the systems and methods described herein may detect when a browser is running as a foreground application on a computing device and then monitor computing activity on the device to determine to a specified degree of certainty whether the browser is operating in private browsing mode. In addition, an administrator of the computing device may specify what action is to be taken when private browsing mode is detected. Because the systems and methods described herein are not necessarily dependent on any particular browser features or internal operations, they may be particularly well suited to an operating environment where such access is limited, such as on a mobile device.

Figure 2:
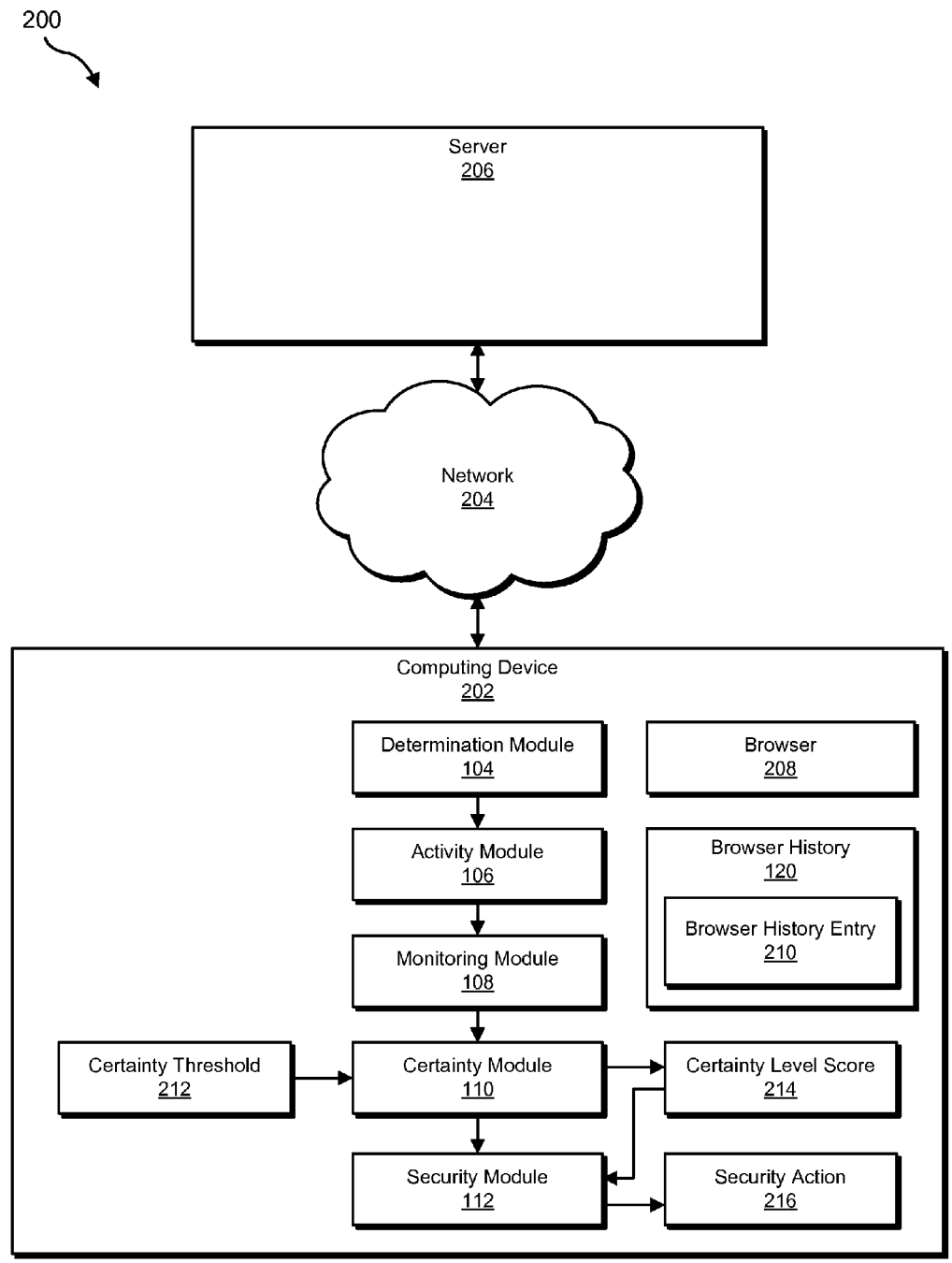
FIG. 2 is a block diagram of an additional exemplary system for detecting private browsing mode.

The following will provide, with reference to FIGS. 1-2, detailed descriptions of exemplary systems for detecting private browsing mode. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 4 and 5, respectively.

FIG. 1 is a block diagram of an exemplary system 100 for detecting private browsing mode. As illustrated in this figure, exemplary system 100 may include one or more modules 102 for performing one or more tasks. For example, and as will be explained in greater detail below, exemplary system 100 may include a determination module 104 that determines that a browser application is operating as a foreground application on a computing device. Exemplary system 100 may also include an activity module 106 that detects computing activity occurring on the computing device while the browser is operating in the foreground.

In addition, and as will be described in greater detail below, exemplary system 100 may include a monitoring module 108 that determines that no new entry has been made in the browser's history. Exemplary system 100 may also include a certainty module 110 that that, in response to determining that no new entry has been made in the browser's history, increments a certainty level score that identifies a level of certainty that the browser is executing in private browsing mode. Certainty module 110 may also determine that the certainty level score has exceeded a certainty threshold, indicating that the browser is likely to be executing in private browsing mode. Exemplary system 100 may also include a security module 112 that performs a security action in response to determining that the browser is likely to be executing in private browsing mode. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or server 206), computing system 410 in FIG. 4, and/or portions of exemplary network architecture 500 in FIG. 5. One or more of modules 102 in FIG. 1 may also represent all or portions of one or more special-purpose computers configured to perform one or more tasks.

As illustrated in FIG. 1, exemplary system 100 may also include one or more databases, such as browser history 120. In one example, browser history 120 may be configured to store a record of websites visited by a browser executing on the computing device.

Browser history 120 may represent portions of a single database or computing device or a plurality of databases or computing devices. For example, browser history 120 may represent a portion of server 206 in FIG. 2, computing system 410 in FIG. 4, and/or portions of exemplary network architecture 500 in FIG. 5. Alternatively, browser history 120 in FIG. 1 may represent one or more physically separate devices capable of being accessed by a computing device, such as server 206 in FIG. 2, computing system 410 in FIG. 4, and/or portions of exemplary network architecture 500 in FIG. 5.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a server 206 via a network 204. In one example, computing device 202 may be programmed with one or more of modules 102 and/or may store all or a portion of the data in browser history 120. Additionally or alternatively, server 206 may be programmed with one or more of modules 102 and/or may store all or a portion of the data in browser history 120.

In one embodiment, one or more of modules 102 from FIG. 1 may, when executed by at least one processor of computing device 202 and/or server 206, enable computing device 202 and/or server 206 to detect whether a browser is operating in private browsing mode. For example, and as will be described in greater detail below, determination module 104 may cause computing device 202 and/or server 206 to determine that browser 208 is operating as a foreground application on computing device 202. Activity module 106 may then detect computing activity occurring on computing device 202 while browser 208 is operating in the foreground.

Monitoring module 108 may then determine that no new browser history entry 210 has been made in browser history 120. In response to this determination, certainty module 110 may increment a certainty level score 214 that identifies a level of certainty that browser 208 is executing in private browsing mode. If certainty module 110 determines that certainty level score 214 has exceeded certainty threshold 212, certainty module 110 may determine that browser 208 is likely to be executing in private browsing mode. In response to this determination, security module 112 may perform a security action 216.

Computing device 202 generally represents any type or form of computing device capable of reading computer-executable instructions. Examples of computing device 202 include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, exemplary computing system 410 in FIG. 4, or any other suitable computing device.

Server 206 generally represents any type or form of computing device that is capable of storing, comparing, and/or providing data. Examples of server 206 include, without limitation, web servers, application servers, and database servers configured to provide various database or network services and/or run certain software applications.

Network 204 generally represents any medium or architecture capable of facilitating communication or data transfer. Examples of network 204 include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), exemplary network architecture 500 in FIG. 5, or the like. Network 204 may facilitate communication or data transfer using wireless or wired connections. In one embodiment, network 204 may facilitate communication between computing device 202 and server 206.

Figure 3:
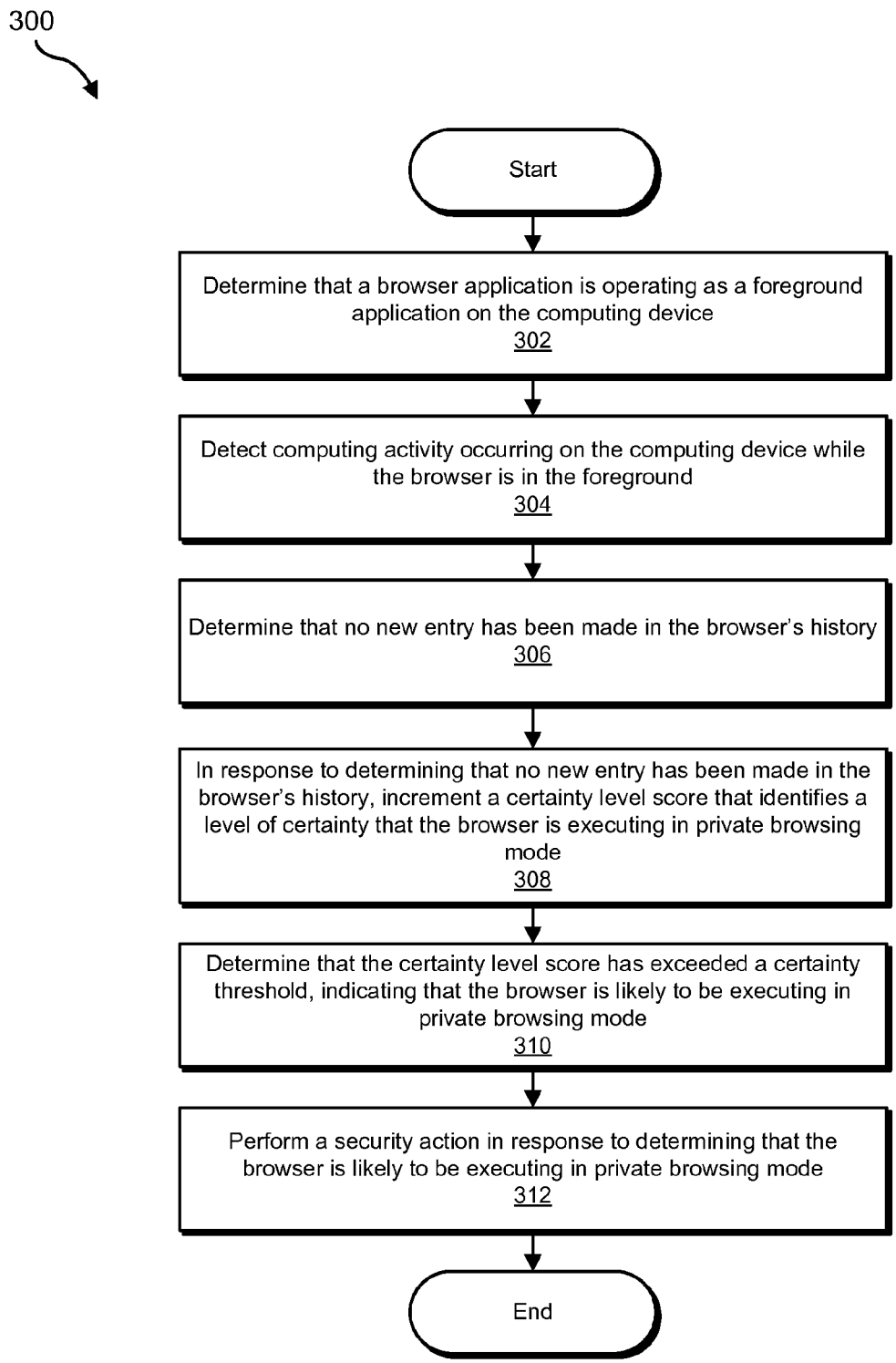
FIG. 3 is a flow diagram of an exemplary method for detecting private browsing mode.

FIG. 3 is a flow diagram of an exemplary computer-implemented method 300 for detecting private browsing mode. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 410 in FIG. 4, and/or portions of exemplary network architecture 500 in FIG. 5.

As illustrated in FIG. 3, at step 302 one or more of the systems described herein may determine that a browser application is operating as a foreground application on the computing device. For example, at step 302 determination module 104 may, as part of computing device 202 in FIG. 2, determine that browser 208 is operating as a foreground application on computing device 202.

The phrase "foreground application," as used herein, generally refers to a software program with a user interface rendered on the display of a computing device and selected by the operating system of the computing device as the default target for user input, such as keyboard input, mouse clicks, or touchscreen input. Typically, only one application operates as a foreground application at any given time.

Determination module 104 may determine that a browser application is operating as a foreground application on the computing device in any suitable manner. For example, determination module 104 may utilize application programming interfaces (APIs) provided by the operating system to identify applications running on the computing device and determine whether each application is operating as a foreground application. In some examples, the browser application may provide an API that reports whether the browser is operating as a foreground application.

In one embodiment, the computing device may be a mobile device, such as a smartphone. As used herein, the term "smartphone" generally refers to a mobile computing device capable of performing various computing tasks, such as initiating and receiving telephonic communications, sending and receiving text messages, accessing the Internet via network interfaces (such as mobile phone networks or WIFI networks), and/or executing software programs such as calendar programs, task management programs, games, and browser applications, among other tasks.

A mobile device may utilize a mobile operating system such as GOOGLE ANDROID or APPLE IOS as a platform for executing applications and to provide a user interface. In addition, a smartphone operating system may provide an API to identify applications running as a foreground application. For example, the ANDROID operating system's activityManager.getRunningAppProcesses( ) API may return an array of data records for all running applications. Each record may include a flag indicating whether the application is running as a foreground application.

At step 304, one or more of the systems described herein may detect computing activity occurring on the computing device while the browser is operating in the foreground. For example, at step 304 activity module 106 may, as part of computing device 202 in FIG. 2, detect computing activity occurring on computing device 202 while browser 208 is operating in the foreground.

The systems described herein may perform step 304 in a variety of ways. In some examples, the systems described herein may select a sampling interval that determines how often computing activity will be measured. The phrase "sampling interval," as used herein, generally refers to a period of time between each collection of computing activity statistics. In one example, this sampling interval may determine how quickly activity module 106 detects browser-related computing activity. A longer sampling interval may also more time for other applications to execute, so that the process of detecting computing activity does not adversely affect the performance of other executing applications.

In some examples, the systems described herein may detect the computing activity by determining that network communication has occurred during a sampling interval while the browser is operating in the foreground. For example, activity module 106 may access network communication statistics for the computing device that indicate the quantity of data sent and/or received by the computing device via its network interfaces. In this example, activity module 106 may determine network communication has occurred by recognizing a change in the communication statistics over a sampling interval.

In another example, the computing device operating system may provide an API that notifies activity module 106 that data is being transmitted or received via a network interface. The API may also provide access to the data being communicated. Activity module 106 may then extract network communication data, such as a destination network address, hostname, or uniform resource identifier (URI) for the network service with which the computing device is communicating. As will be described in greater detail below, network communication data may be used to determine whether a browser is operating in private browsing mode.

In some examples, the systems described herein may detect the computing activity by determining that CPU activity has exceeded a CPU activity threshold during a sampling interval while the browser is operating in the foreground. For example, activity module 106 may collect processor statistics periodically to determine whether processor activity has reached a threshold indicating that the browser is actively in use. In some examples, the computing device operating system may provide statistics indicating the percentage of processor activity that may be attributed to the browser application.

In some examples, the systems described herein may detect the computing activity by determining that memory usage has exceeded a memory usage threshold during a sampling interval while the browser is operating in the foreground. For example, activity module 106 may determine that memory usage by the browser has increased over the period of a sampling interval, indicating that the browser is actively in use. In another example, activity module 106 may determine that overall memory usage on the computing device has increased over the period of a sampling interval while the browser operated as a foreground application, which may indicate that the browser is actively in use.

At step 306, one or more of the systems described herein may determine that no new entry has been made in the browser's history. For example, at step 306 determination module 104 may, as part of computing device 202 in FIG. 2, determine that no new browser history entry 210 has been made in browser history 120.

The phrase "browser history," as used herein, generally refers to any type or form of record of list of web pages viewed by a user of a web browser application. A browser history may be maintained as a file or database listing the universal resource identifiers (URIs) of viewed web pages. The browser history may also be stored on the computing device or a remote storage location.

Determination module 104 may determine that no new entry has been made in the browser's history in any suitable manner. For example, determination module 104 may access the browser's history file stored on the computing device after each sampling interval and determine if a new entry has been added to the browser's history during the sampling interval. In another example, the browser may provide an API that notifies determination module 104 when an entry has been added to the browser history.

At step 308, one or more of the systems described herein may, in response to determining that no new entry has been made in the browser's history, increment a certainty level score that identifies a level of certainty that the browser is executing in private browsing mode. For example, at step 308, certainty module 110 may, as part of computing device 202 in FIG. 2, increment a certainty level score 214 that identifies a level of certainty that browser 208 is executing in private browsing mode in response to determining that no new browser history entry 210 has been made in browser history 120.

The phrase "level of certainty," as used herein, generally refers to a measure of confidence in the determination that the browser is executing in private browsing mode. In the absence of means for directly querying the browser to determine the browsing mode, the browsing mode may be inferred by (1) observing computing activity (such as memory usage, processor usage, or network communication) to determine with a degree of certainty that the browser is actively in use and then (2) examining the browser history to determine whether the browser is making a record of web pages viewed. As will be described in greater detail below, the level of certainty may vary depending upon the nature of computing activity observed.

Certainty module 110 may increment a certainty level score in a variety of ways. For example, certainty module 110 may increment a certainty level score by different amounts, depending on the nature of computing activity observed. Certainty module 110 may also increment the certainty level score when the activity module detects a small increase in memory usage or processor activity during a sampling interval. In this example, a larger increase in memory usage or processor activity may result in a larger increment to the certainty level score. In addition, any level of network activity may justify a larger increment to the certainty level score. Observation of network communication data in a stream of network data, such as a destination network address, hostname, or uniform resource identifier (URI), may also justify incrementing the certainty level score to a maximum value.

At step 310, one or more of the systems described herein may determine that the certainty level score has exceeded a certainty threshold, indicating that the browser is likely to be executing in private browsing mode. For example, at step 308 certainty module 110 may, as part of computing device 202 in FIG. 2, determine that certainty level score 214 has exceeded certainty threshold 212, indicating that browser 209 is likely to be executing in private browsing mode.

The phrase "certainty threshold," as used herein, generally refers to a value of the certainty level score that is deemed sufficient to justify a security action. Certainty module 110 may determine that the certainty level score has exceeded the certainty threshold in a variety of ways. For example, the certainty threshold may be a single value indicating a high level of certainty that the browser is operating in private browsing mode. In another example, certainty module 110 may maintain multiple certainty thresholds representing low, medium, or high levels of certainty, which may be used to trigger various security actions.

At step 312, one or more of the systems described herein may perform a security action in response to determining that the browser is likely to be executing in private browsing mode. For example, at step 312 security module 112 may, as part of computing device 202 in FIG. 2, perform security action 216 in response to determining that browser 208 is likely to be executing in private browsing mode.

Security module 112 may perform one or more security actions in a variety of ways. Examples of such security actions include, without limitation, (1) notifying an administrative user that the browser is likely to be executing in private browsing mode, (2) displaying a message that the use of private browsing mode is restricted on the computing device, (3) blocking execution of the browser application, and/or (4) blocking network communication on the computing device.

In some examples, the security action is selected to be performed based at least in part on the magnitude of the certainty level score relative to the certainty threshold. For example, upon determination that the certainty level score has exceeded a low certainty threshold, security module 112 may display a message to the user that the use of private browsing mode is restricted on the computing device. If the certainty level scores exceeds a medium certainty threshold, security module 112 may notify an administrator that the browser is likely executing in private browsing mode. If the certainty level score exceeds a high certainty threshold, security module 112 may block execution of the browser application or block network communication on the computing device.

As explained above, the systems and methods described herein may detect when a browser is operating in private browsing mode by detecting computing activity (such as processor activity, memory usage, or network communication) when the browser is executing as a foreground application. By doing so, the systems and methods described herein may determine with a degree of certainty that a browser is executing in private browsing mode while executing under normal access restrictions, without any special permissions to the browser or operating system kernel. This may in turn enable parents to maintain control of a child's browser usage on a mobile device and/or an organization to be assured that a mobile computing device is being used in compliance with policy.

Figure 4:
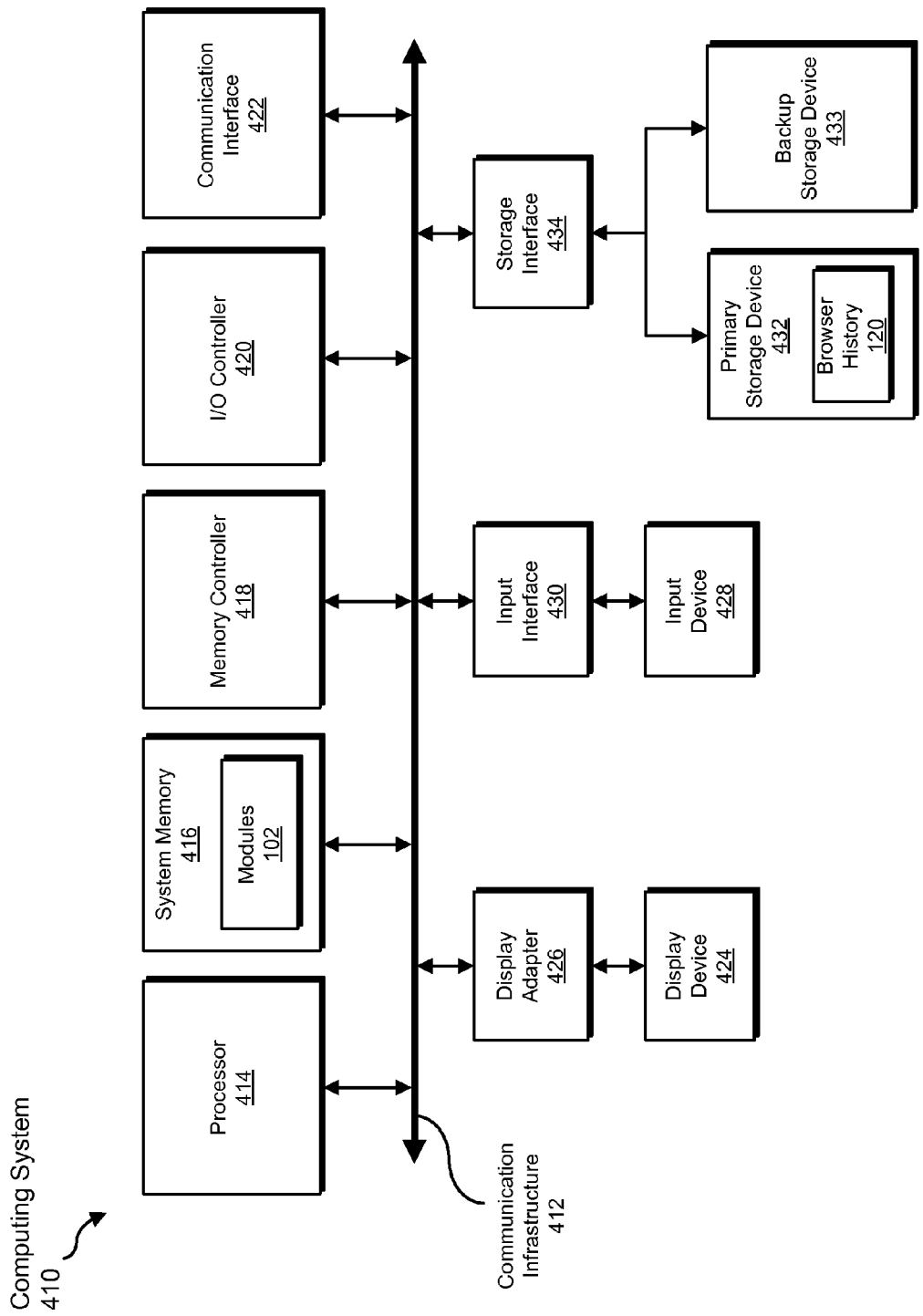
FIG. 4 is a block diagram of an exemplary computing system capable of implementing one or more of the embodiments described and/or illustrated herein.

FIG. 4 is a block diagram of an exemplary computing system 410 capable of implementing one or more of the embodiments described and/or illustrated herein. For example, all or a portion of computing system 410 may perform and/or be a means for performing, either alone or in combination with other elements, one or more of the steps described herein (such as one or more of the steps illustrated in FIG. 3). All or a portion of computing system 410 may also perform and/or be a means for performing any other steps, methods, or processes described and/or illustrated herein.

Computing system 410 broadly represents any single or multi-processor computing device or system capable of executing computer-readable instructions. Examples of computing system 410 include, without limitation, workstations, laptops, client-side terminals, servers, distributed computing systems, handheld devices, or any other computing system or device. In its most basic configuration, computing system 410 may include at least one processor 414 and a system memory 416.

Processor 414 generally represents any type or form of physical processing unit (e.g., a hardware-implemented central processing unit) capable of processing data or interpreting and executing instructions. In certain embodiments, processor 414 may receive instructions from a software application or module. These instructions may cause processor 414 to perform the functions of one or more of the exemplary embodiments described and/or illustrated herein.

System memory 416 generally represents any type or form of volatile or non-volatile storage device or medium capable of storing data and/or other computer-readable instructions. Examples of system memory 416 include, without limitation, Random Access Memory (RAM), Read Only Memory (ROM), flash memory, or any other suitable memory device. Although not required, in certain embodiments computing system 410 may include both a volatile memory unit (such as, for example, system memory 416) and a non-volatile storage device (such as, for example, primary storage device 432, as described in detail below). In one example, one or more of modules 102 from FIG. 1 may be loaded into system memory 416.

In certain embodiments, exemplary computing system 410 may also include one or more components or elements in addition to processor 414 and system memory 416. For example, as illustrated in FIG. 4, computing system 410 may include a memory controller 418, an Input/Output (I/O) controller 420, and a communication interface 422, each of which may be interconnected via a communication infrastructure 412. Communication infrastructure 412 generally represents any type or form of infrastructure capable of facilitating communication between one or more components of a computing device. Examples of communication infrastructure 412 include, without limitation, a communication bus (such as an Industry Standard Architecture (ISA), Peripheral Component Interconnect (PCI), PCI Express (PCIe), or similar bus) and a network.

Memory controller 418 generally represents any type or form of device capable of handling memory or data or controlling communication between one or more components of computing system 410. For example, in certain embodiments memory controller 418 may control communication between processor 414, system memory 416, and I/O controller 420 via communication infrastructure 412.

I/O controller 420 generally represents any type or form of module capable of coordinating and/or controlling the input and output functions of a computing device. For example, in certain embodiments I/O controller 420 may control or facilitate transfer of data between one or more elements of computing system 410, such as processor 414, system memory 416, communication interface 422, display adapter 426, input interface 430, and storage interface 434.

Communication interface 422 broadly represents any type or form of communication device or adapter capable of facilitating communication between exemplary computing system 410 and one or more additional devices. For example, in certain embodiments communication interface 422 may facilitate communication between computing system 410 and a private or public network including additional computing systems. Examples of communication interface 422 include, without limitation, a wired network interface (such as a network interface card), a wireless network interface (such as a wireless network interface card), a modem, and any other suitable interface. In at least one embodiment, communication interface 422 may provide a direct connection to a remote server via a direct link to a network, such as the Internet. Communication interface 422 may also indirectly provide such a connection through, for example, a local area network (such as an Ethernet network), a personal area network, a telephone or cable network, a cellular telephone connection, a satellite data connection, or any other suitable connection.

In certain embodiments, communication interface 422 may also represent a host adapter configured to facilitate communication between computing system 410 and one or more additional network or storage devices via an external bus or communications channel. Examples of host adapters include, without limitation, Small Computer System Interface (SCSI) host adapters, Universal Serial Bus (USB) host adapters, Institute of Electrical and Electronics Engineers (IEEE) 1394 host adapters, Advanced Technology Attachment (ATA), Parallel ATA (PATA), Serial ATA (SATA), and External SATA (eSATA) host adapters, Fibre Channel interface adapters, Ethernet adapters, or the like. Communication interface 422 may also allow computing system 410 to engage in distributed or remote computing. For example, communication interface 422 may receive instructions from a remote device or send instructions to a remote device for execution.

As illustrated in FIG. 4, computing system 410 may also include at least one display device 424 coupled to communication infrastructure 412 via a display adapter 426. Display device 424 generally represents any type or form of device capable of visually displaying information forwarded by display adapter 426. Similarly, display adapter 426 generally represents any type or form of device configured to forward graphics, text, and other data from communication infrastructure 412 (or from a frame buffer, as known in the art) for display on display device 424.

As illustrated in FIG. 4, exemplary computing system 410 may also include at least one input device 428 coupled to communication infrastructure 412 via an input interface 430. Input device 428 generally represents any type or form of input device capable of providing input, either computer or human generated, to exemplary computing system 410. Examples of input device 428 include, without limitation, a keyboard, a pointing device, a speech recognition device, or any other input device.

As illustrated in FIG. 4, exemplary computing system 410 may also include a primary storage device 432 and a backup storage device 433 coupled to communication infrastructure 412 via a storage interface 434. Storage devices 432 and 433 generally represent any type or form of storage device or medium capable of storing data and/or other computer-readable instructions. For example, storage devices 432 and 433 may be a magnetic disk drive (e.g., a so-called hard drive), a solid state drive, a floppy disk drive, a magnetic tape drive, an optical disk drive, a flash drive, or the like. Storage interface 434 generally represents any type or form of interface or device for transferring data between storage devices 432 and 433 and other components of computing system 410. In one example, browser history 120 from FIG. 1 may be stored in primary storage device 432.

In certain embodiments, storage devices 432 and 433 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 432 and 433 may also include other similar structures or devices for allowing computer software, data, or other computer-readable instructions to be loaded into computing system 410. For example, storage devices 432 and 433 may be configured to read and write software, data, or other computer-readable information. Storage devices 432 and 433 may also be a part of computing system 410 or may be a separate device accessed through other interface systems.

Many other devices or subsystems may be connected to computing system 410. Conversely, all of the components and devices illustrated in FIG. 4 need not be present to practice the embodiments described and/or illustrated herein. The devices and subsystems referenced above may also be interconnected in different ways from that shown in FIG. 4. Computing system 410 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable medium. The phrase "computer-readable medium," as used herein, generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The computer-readable medium containing the computer program may be loaded into computing system 410. All or a portion of the computer program stored on the computer-readable medium may then be stored in system memory 416 and/or various portions of storage devices 432 and 433. When executed by processor 414, a computer program loaded into computing system 410 may cause processor 414 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 410 may be configured as an Application Specific Integrated Circuit (ASIC) adapted to implement one or more of the exemplary embodiments disclosed herein.

Figure 5:
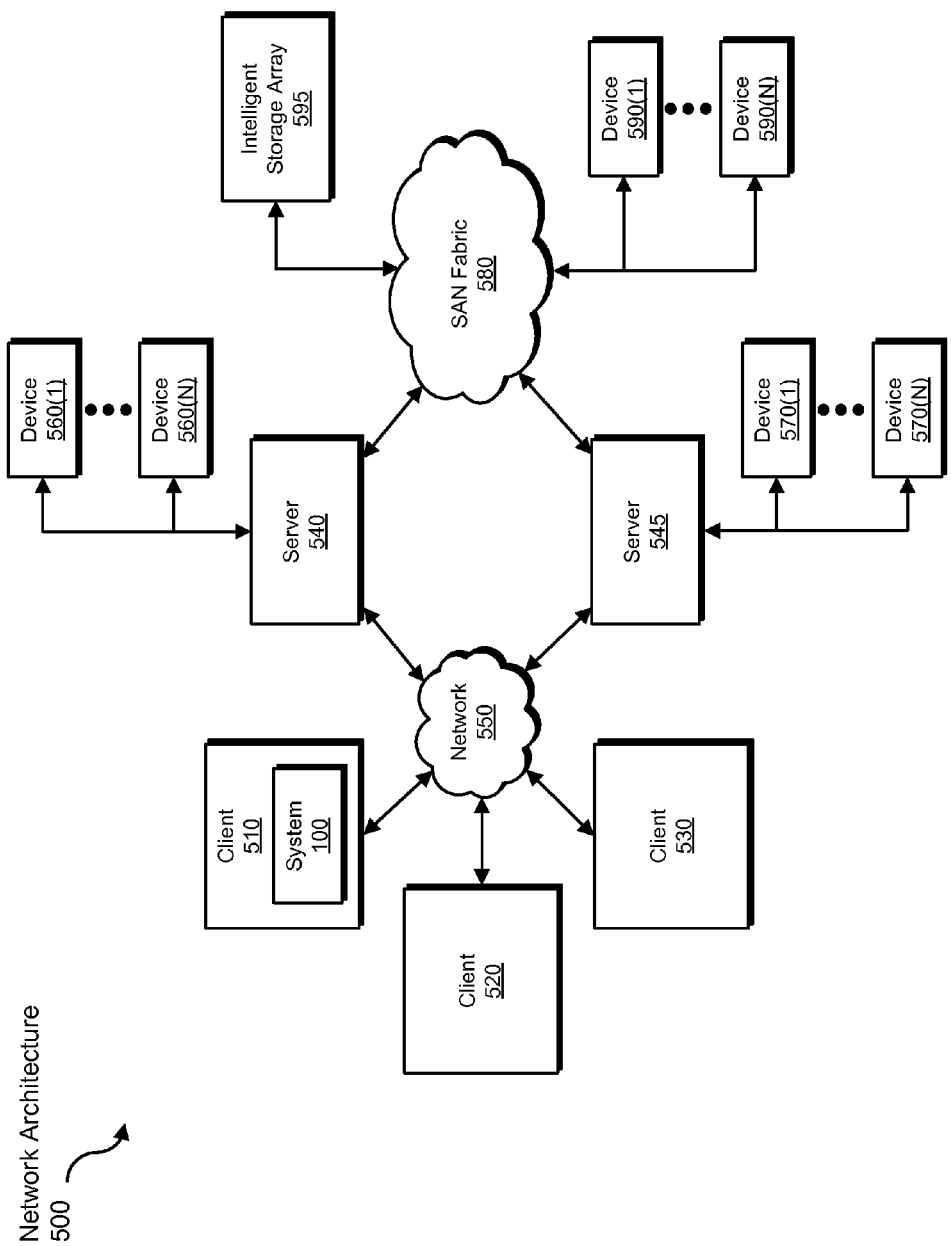
FIG. 5 is a block diagram of an exemplary computing network capable of implementing one or more of the embodiments described and/or illustrated herein.

FIG. 5 is a block diagram of an exemplary network architecture 500 in which client systems 510, 520, and 530 and servers 540 and 545 may be coupled to a network 550. As detailed above, all or a portion of network architecture 500 may perform and/or be a means for performing, either alone or in combination with other elements, one or more of the steps disclosed herein (such as one or more of the steps illustrated in FIG. 3). All or a portion of network architecture 500 may also be used to perform and/or be a means for performing other steps and features set forth in the instant disclosure.

Client systems 510, 520, and 530 generally represent any type or form of computing device or system, such as exemplary computing system 410 in FIG. 4. Similarly, servers 540 and 545 generally represent computing devices or systems, such as application servers or database servers, configured to provide various database services and/or run certain software applications. Network 550 generally represents any telecommunication or computer network including, for example, an intranet, a WAN, a LAN, a PAN, or the Internet. In one example, client systems 510, 520, and/or 530 and/or servers 540 and/or 545 may include all or a portion of system 100 from FIG. 1.

As illustrated in FIG. 5, one or more storage devices 560(1)-(N) may be directly attached to server 540. Similarly, one or more storage devices 570(1)-(N) may be directly attached to server 545. Storage devices 560(1)-(N) and storage devices 570(1)-(N) generally represent any type or form of storage device or medium capable of storing data and/or other computer-readable instructions. In certain embodiments, storage devices 560(1)-(N) and storage devices 570(1)-(N) may represent Network-Attached Storage (NAS) devices configured to communicate with servers 540 and 545 using various protocols, such as Network File System (NFS), Server Message Block (SMB), or Common Internet File System (CIFS).

Servers 540 and 545 may also be connected to a Storage Area Network (SAN) fabric 580. SAN fabric 580 generally represents any type or form of computer network or architecture capable of facilitating communication between a plurality of storage devices. SAN fabric 580 may facilitate communication between servers 540 and 545 and a plurality of storage devices 590(1)-(N) and/or an intelligent storage array 595. SAN fabric 580 may also facilitate, via network 550 and servers 540 and 545, communication between client systems 510, 520, and 530 and storage devices 590(1)-(N) and/or intelligent storage array 595 in such a manner that devices 590(1)-(N) and array 595 appear as locally attached devices to client systems 510, 520, and 530. As with storage devices 560(1)-(N) and storage devices 570(1)-(N), storage devices 590(1)-(N) and intelligent storage array 595 generally represent any type or form of storage device or medium capable of storing data and/or other computer-readable instructions.

In certain embodiments, and with reference to exemplary computing system 410 of FIG. 4, a communication interface, such as communication interface 422 in FIG. 4, may be used to provide connectivity between each client system 510, 520, and 530 and network 550. Client systems 510, 520, and 530 may be able to access information on server 540 or 545 using, for example, a web browser or other client software. Such software may allow client systems 510, 520, and 530 to access data hosted by server 540, server 545, storage devices 560(1)-(N), storage devices 570(1)-(N), storage devices 590(1)-(N), or intelligent storage array 595. Although FIG. 5 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 540, server 545, storage devices 560(1)-(N), storage devices 570(1)-(N), storage devices 590(1)-(N), intelligent storage array 595, or any combination thereof. All or a portion of one or more of the exemplary embodiments disclosed herein may also be encoded as a computer program, stored in server 540, run by server 545, and distributed to client systems 510, 520, and 530 over network 550.

As detailed above, computing system 410 and/or one or more components of network architecture 500 may perform and/or be a means for performing, either alone or in combination with other elements, one or more steps of an exemplary method for detecting private browsing mode.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

In various embodiments, all or a portion of exemplary system 100 in FIG. 1 may facilitate multi-tenancy within a cloud-based computing environment. In other words, the software modules described herein may configure a computing system (e.g., a server) to facilitate multi-tenancy for one or more of the functions described herein. For example, one or more of the software modules described herein may program a server to enable two or more clients (e.g., customers) to share an application that is running on the server. A server programmed in this manner may share an application, operating system, processing system, and/or storage system among multiple customers (i.e., tenants). One or more of the modules described herein may also partition data and/or configuration information of a multi-tenant application for each customer such that one customer cannot access data and/or configuration information of another customer.

According to various embodiments, all or a portion of exemplary system 100 in FIG. 1 may be implemented within a virtual environment. For example, the modules and/or data described herein may reside and/or execute within a virtual machine. As used herein, the phrase "virtual machine" generally refers to any operating system environment that is abstracted from computing hardware by a virtual machine manager (e.g., a hypervisor). Additionally or alternatively, the modules and/or data described herein may reside and/or execute within a virtualization layer. As used herein, the phrase "virtualization layer" generally refers to any data layer and/or application layer that overlays and/or is abstracted from an operating system environment. A virtualization layer may be managed by a software virtualization solution (e.g., a file system filter) that presents the virtualization layer as though it were part of an underlying base operating system. For example, a software virtualization solution may redirect calls that are initially directed to locations within a base file system and/or registry to locations within a virtualization layer.

In some examples, all or a portion of exemplary system 100 in FIG. 1 may represent portions of a mobile computing environment. Mobile computing environments may be implemented by a wide range of mobile computing devices, including mobile phones, tablet computers, e-book readers, personal digital assistants, wearable computing devices (e.g., computing devices with a head-mounted display, smartwatches, etc.), and the like. In some examples, mobile computing environments may have one or more distinct features, including, for example, reliance on battery power, presenting only one foreground application at any given time, remote management features, touchscreen features, location and movement data (e.g., provided by Global Positioning Systems, gyroscopes, accelerometers, etc.), restricted platforms that restrict modifications to system-level configurations and/or that limit the ability of third-party software to inspect the behavior of other applications, controls to restrict the installation of applications (e.g., to only originate from approved application stores), etc. Various functions described herein may be provided for a mobile computing environment and/or may interact with a mobile computing environment.

In addition, all or a portion of exemplary system 100 in FIG. 1 may represent portions of, interact with, consume data produced by, and/or produce data consumed by one or more systems for information management. As used herein, the phrase "information management" may refer to the protection, organization, and/or storage of data. Examples of systems for information management may include, without limitation, storage systems, backup systems, archival systems, replication systems, high availability systems, data search systems, virtualization systems, and the like.

In some embodiments, all or a portion of exemplary system 100 in FIG. 1 may represent portions of, produce data protected by, and/or communicate with one or more systems for information security. As used herein, the phrase "information security" may refer to the control of access to protected data. Examples of systems for information security may include, without limitation, systems providing managed security services, data loss prevention systems, identity authentication systems, access control systems, encryption systems, policy compliance systems, intrusion detection and prevention systems, electronic discovery systems, and the like.

According to some examples, all or a portion of exemplary system 100 in FIG. 1 may represent portions of, communicate with, and/or receive protection from one or more systems for endpoint security. As used herein, the phrase "endpoint security" may refer to the protection of endpoint systems from unauthorized and/or illegitimate use, access, and/or control. Examples of systems for endpoint protection may include, without limitation, anti-malware systems, user authentication systems, encryption systems, privacy systems, spam-filtering services, and the like.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a mobile computing system that limits third-party access into a system that is capable of detecting private browsing mode. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method for detecting a private browsing mode, at least a portion of the method being performed by a computing device comprising at least one processor, the method comprising:
    determining that a browser application is operating as a foreground application on the computing device;
    detecting computing activity occurring on the computing device while the browser application is operating as the foreground application, wherein detecting the computing activity comprises determining that a level of activity inside a CPU of the computing device has exceeded a CPU activity threshold;
    determining that no new entry has been made in a browser history of the browser application;
    incrementing a certainty level score that identifies a level of certainty that the browser application is executing in the private browsing mode in response to the browser application operating as the foreground application, the level of activity inside the CPU exceeding the CPU activity threshold, and no new entry having been made in the browser history;
    determining that the certainty level score has exceeded a certainty threshold such that the certainty level score indicates that the browser application is likely to be executing in the private browsing mode; and
    performing a security action in response to determining that the browser application is likely to be executing in the private browsing mode.

2. The computer-implemented method of claim 1, wherein detecting the computing activity comprises selecting a sampling interval that determines how often the computing activity will be measured.

3. The computer-implemented method of claim 2, wherein detecting the computing activity comprises determining that network communication has occurred during the sampling interval while the browser application is operating as the foreground application.

4. The computer-implemented method of claim 2, wherein detecting the computing activity comprises determining that memory usage has exceeded a memory usage threshold during the sampling interval while the browser application is operating as the foreground application.

5. The computer-implemented method of claim 1, wherein performing the security action comprises at least one of:
    notifying an administrative user that the browser application is likely to be executing in the private browsing mode;
    displaying a message that the use of the private browsing mode is restricted on the computing device;
    blocking execution of the browser application;
    blocking network communication on the computing device.

6. The computer-implemented method of claim 5, wherein the security action is selected to be performed based at least in part on the certainty level score relative to the certainty threshold.

7. The computer-implemented method of claim 1, wherein the computing device comprises a mobile device.

8. The method of claim 1, wherein:
    detecting the computing activity comprises extracting network communication data from at least one network communication of the computing device, wherein the network communication data comprises at least one of:
        a destination network address of a network service with which the computing device is communicating;
        a hostname of the network service;
        a uniform resource identifier (URI) of the network service;
    incrementing the certainty level score comprises incrementing the certainty level score based at least in part on the network communication data.

9. A system for detecting a private browsing mode, the system comprising:
    a determination module, stored in a memory, that determines that a browser application is operating as a foreground application on a computing device;
    an activity module, stored in the memory, that detects computing activity occurring on the computing device while the browser application is operating as the foreground application by determining that a level of activity inside a CPU of the computing device has exceeded a CPU activity threshold;
    a monitoring module, stored in the memory, that determines that no new entry has been made in a browser history of the browser application;
    a certainty module, stored in the memory, that:
        increments a certainty level score that identifies a level of certainty that the browser application is executing in the private browsing mode in response to the browser application operating as the foreground application, the level of activity inside the CPU exceeding the CPU activity threshold, and no new entry having been made in the browser history;
        determines that the certainty level score has exceeded a certainty threshold such that the certainty level score indicates that the browser application is likely to be executing in the private browsing mode;

a security module, stored in the memory, that performs a security action in response to determining that the browser application is likely to be executing in the private browsing mode; and at least one processor configured to execute the determination module, the activity module, the monitoring module, the certainty module, and the security module.

10. The system of claim 9, wherein the activity module detects the computing activity by selecting a sampling interval that determines how often the computing activity will be measured.

11. The system of claim 10, wherein the activity module detects the computing activity by determining that network communication has occurred during the sampling interval while the browser application is operating as the foreground application.

12. The system of claim 10, wherein the activity module detects the computing activity by determining that memory usage has exceeded a memory usage threshold during the sampling interval while the browser application is operating as the foreground application.

13. The system of claim 9, wherein the security action comprises at least one of:
  notifying an administrative user that the browser application is likely to be executing in the private browsing mode;
  displaying a message that the use of the private browsing mode is restricted on the computing device;
  blocking execution of the browser application;
  blocking network communication on the computing device.

14. The system of claim 13, wherein the security module selects the security action to be performed based at least in part on the certainty level score relative to the certainty threshold.

15. The system of claim 9, wherein the computing device comprises a mobile device.

16. The system of claim 9, wherein: the activity module extracts network communication data from at least one network communication of the computing device, wherein the network communication data comprises at least one of:
  a destination network address of a network service with which the computing device is communicating;
  a hostname of the network service;
  a uniform resource identifier (URI) of the network service;
  the certainty module increments the certainty level score based at least in part on the network communication data.

17. A non-transitory computer-readable-storage medium comprising one or more computer-readable instructions that, when executed by at least one processor of a computing device, cause the computing device to:
  determine that a browser application is operating as a foreground application on the computing device;
  detect computing activity occurring on the computing device while the browser application is operating as the foreground application, wherein detecting the computing activity comprises determining that a level of activity inside a CPU of the computing device has exceeded a CPU activity threshold;
  determine that no new entry has been made in a browser history of the browser application;
  increment a certainty level score that identifies a level of certainty that the browser application is executing in a private browsing mode in response to the browser application operating as the foreground application, the level of activity inside the CPU exceeding the CPU activity threshold, and no new entry having been made in the browser history;
  determine that the certainty level score has exceeded a certainty threshold such that the certainty level score indicates the browser application is likely to be executing in the private browsing mode; and
  perform a security action in response to determining that the browser application is likely to be executing in the private browsing mode.

18. The non-transitory computer-readable-storage medium of claim 17, wherein the one or more computer-readable instructions cause the computing device to detect the computing activity by selecting a sampling interval that determines how often the computing activity will be measured.

19. The non-transitory computer-readable-storage medium of claim 18, wherein the one or more computer-readable instructions cause the computing device to detect the computing activity by determining that network communication has occurred during the sampling interval while the browser application is operating as the foreground application.

* * * * *